United States Patent [19]

Reuschenbach et al.

[11] 4,309,026
[45] Jan. 5, 1982

[54] GAS SPRING

[75] Inventors: Hermann Reuschenbach, Rossbach; Willi Schäfer, Koblenz, both of Fed. Rep. of Germany

[73] Assignee: Stabilus GmbH, Koblenz-Neuendorf, Fed. Rep. of Germany

[21] Appl. No.: 102,422

[22] Filed: Dec. 11, 1979

[30] Foreign Application Priority Data

Dec. 11, 1978 [DE] Fed. Rep. of Germany ....... 2855560

[51] Int. Cl.³ .............................. F16F 5/00; F16F 9/06
[52] U.S. Cl. ................................. 267/121; 267/64.25; 188/300
[58] Field of Search ............. 267/134, 120, 121, 65 R; 188/300, 312, 301; 108/10, 79, 147; 248/566, 573, 651, 157

[56] References Cited

U.S. PATENT DOCUMENTS

| | | | |
|---|---|---|---|
| 3,762,514 | 10/1973 | Freitag | 188/300 |
| 3,828,651 | 8/1974 | Dorner et al. | 188/300 |
| 4,078,778 | 3/1978 | Hwbweber | 267/65 R |
| 4,166,612 | 9/1979 | Freitag et al. | 188/300 |
| 4,230,309 | 10/1980 | Schnitzius | 188/300 |

FOREIGN PATENT DOCUMENTS 2545563 4/1976 Fed. Rep. of Germany .... 267/65 R
1059162 2/1963 United Kingdom .
1285264 8/1972 United Kingdom .

Primary Examiner—James B. Marbert
Attorney, Agent, or Firm—Brumbaugh, Graves, Donohue & Raymond

[57] ABSTRACT

In the illustrative embodiments of the invention described, a gas spring useful as a height-adjustment and weight-compensation device, as, for example, in a height-adjustable table, includes structure that is responsive to the drop in gas pressure within the primary cylinder below a predetermined level to lock or brake the piston rod against abrupt movement with respect to the primary cylinder if a compressive load is thereafter applied to the gas spring. The pressure-responsive structure preferably includes a sealed auxiliary cylinder-piston unit carried by the piston rod internally of the gas spring. The auxiliary unit contains a separate pressurized body of gas, and either the auxiliary cylinder or piston is axially movable, in response to the greater internal pressure within the auxiliary unit when gas pressure within the primary cylinder drops too low, to engage the locking or braking device. So long as gas pressure within the primary cylinder remains above the predetermined minimum level, the braking device is biased away from the engaged position.

23 Claims, 3 Drawing Figures

GAS SPRING

BACKGROUND OF THE INVENTION

1. Field of the Invention

This invention relates to gas springs of the cylinder-and-piston type and particularly concerns improved structure for automatically braking the piston rod against axial movement relative to the cylinder in the event of a pressure drop within the cylinder greater than a predetermined amount.

2. The Prior Art

Gas springs are commonly used as counter balancing devices in tables, such as draftman's tables and the like. When so used, the cylinder member and the piston rod typically are connected to respective telescoping tubular leg elements, which in turn are connected to the base and table portions of the table unit. Once adjusted to provide the desired table height, the leg elements may themselves be locked with respect to each other in the desired height position by a releasable locking device. The height position is then frequently maintained for a long period, during which leakage of pressurized gas from the cylinder may occur. If sufficient pressure is lost, the gas spring thereafter might not be able to fulfill the intended function of weight compensation. As a consequence, when the locking device between the leg elements is released the entire table might drop abruptly at high velocity with an attendant risk of injury to the user or others adjacent the table. In order to avoid such accidents, it has been proposed in the past to include a provision in the gas spring to brake or lock the piston rod with respect to the cylinder member upon the occurrence of a certain pressure drop within the cylinder.

A gas spring of this type is disclosed, for instance, in the commonly-owned German Offenlegungsschrift No. 25 40 402. In this known device, the braking structure includes an annular braking piston that is sealed both with respect to the inner cylindrical face of the cylinder member and with respect to the piston rod. The braking piston is subjected on one side to the gas pressure within the cylinder cavity and on the other side to the force of a mechanical spring. Should the cylinder pressure drop too low, the annular braking piston is urged axially by the mechanical spring so as to move a braking sleeve surrounding the piston rod into engagement with the piston rod. To that end, the braking sleeve is formed with a conical outer surface which coacts with a surrounding ring to constrict the internal diameter of the sleeve and bring it into gripping engagement with the piston rod, thereby braking the rod with respect to the cylinder member. Engagement of the piston rod by the sleeve, however, can damage the highly polished surface of the piston rod, with a resulting loss of effectiveness of the seal between the piston rod and the cylinder. The present invention overcomes this and other disadvantages of the prior art.

SUMMARY

In accordance with the invention, an auxiliary cylinder-piston unit is provided on the piston rod within the main or primary cylinder of the gas spring. The auxiliary unit includes an auxiliary cylinder and an auxiliary piston movable with respect thereto, the auxiliary cylinder and piston defining an auxiliary chamber which is sealed relative to the primary cylinder cavity and contains a separate body of pressurized gas. Valve structure, operable from outside the gas spring, is provided between the auxiliary chamber and the primary cylinder cavity to allow gas flow therebetween so as to permit pressure equalization between the two chambers. A braking device is carried by the piston rod within the primary cylinder cavity and is responsive to movement of one of the auxiliary cylinder or auxiliary piston, which itself is movable in response to a predetermined pressure differential between the auxiliary chamber and the primary cylinder cavity, to urge the braking device into engagement with the inner cylindrical face of the cylinder member, thereby braking the piston rod relative to the primary cylinder.

According to the invention, therefore, the braking device moves with the piston rod and engages the inner cylindrical face of the primary cylinder, so that the highly polished outer surface of the piston rod, which passes through the sealed end wall of the primary cylinder, is not directly contacted by the braking device. Hence the piston rod surface is not susceptible to marring, etc. as in the prior art gas springs. Thus, the engagement of the braking device with the internal cylindrical face of the primary cylinder member has no detrimental effect on the function of the gas spring, since the inner cylindrical face has no essential sealing function.

The pressure differential between the auxiliary chamber and the primary cylinder cavity at which the braking device begins to brake can readily be adjusted by pre-stressing the auxiliary cylinder-piston unit towards a position in which the braking device is out of engagement with the primary cylinder, the amount of such pre-stressing determining the pressure differential at which the braking devices become active. Suitably, the pre-stressing function can be incorporated into the braking device itself, as, for example, by use of a spring member as the braking device.

As noted, a further advantage of the invention is that the pressure within the auxiliary chamber can be equalized with the pressure within the primary cylinder cavity when the valve structure between the two chambers is opened. This permits automatic adjustment of the braking device in accordance with different pressure levels within the primary cylinder cavity, which different pressure levels might be used, for instance, where different weights are to be balanced. Since it is the amount of pre-stress provided which determines the magnitude of the pressure differential needed to engage the braking device, it will be appreciated that the braking structure is actuated in response to a predetermined pressure drop in the primary cylinder cavity irrespective of the absolute value of the initial pressure within the cavity.

According to another feature of the invention, the valve structure between the auxiliary chamber and the primary cavity can be made responsive to axial movement of the piston rod with respect to the cylinder member, so that the equalization of pressure between the auxiliary chamber and the primary cavity can be effected simply by bringing the piston rod to a predetermined axial position with respect to the cylinder member. Preferably, the predetermined axial position is one of the terminal positions of the piston rod relative to the cylinder member and, ideally, is the outermost position of the piston rod relative to the cylinder member, at which position the pressure of the gas within the primary cavity is at a minimum.

In one preferred embodiment, the braking device comprises an axially elastically compressible braking member extending radially towards the internal cylindrical face of the primary cylinder, the radial extent of the braking member being increased by axial compression. In this case, the auxiliary cylinder-piston unit is arranged for axial compression of said braking member in response to the occurrence of a pressure drop within the primary cylinder cavity.

In another embodiment, the braking device is a tilting member that is mounted on the piston rod for tilting movement about an axis transverse to the longitudinal axis of the gas spring between two terminal tilting positions, at one of which the tilting member is out of engagement with the internal cylindrical face of the primary cylinder and at the other of which the tilting member is in braking engagement with the primary cylinder. In this case, the auxiliary cylinder-piston unit is arranged to tilt the braking member towards the braking position in response to the occurrence of the pressure drop within the primary cylinder.

Both abovementioned embodiments of the braking device of the invention are advantageous over the braking device known from the above-mentioned German Offenlegungsschrift No. 25 40 402, because both can be easily released by increasing the pressure in the primary cylinder cavity simply by connecting the cavity to an external source of pressurized gas. When the pressure within the primary cylinder cavity is again increased in this matter following engagement of the braking device, both embodiments of the braking devices according to the invention will be released as soon as the pressure differential between the auxiliary chamber and the primary cavity is decreased below the predetermined pressure differential. This was not true in the known prior art device. In the prior art device, it was necessary to increase the pressure in the cavity considerably beyond that pressure at which the braking device had become active, so there was the risk that, after the braking device had been released, the pressure within the primary cavity would be considerably higher than that needed for weight compensation. This condition of unnecessarily high pressure could result, upon the next attempted height adjustment of the table or the like supported by the gas spring, of the rod being driven out of the primary cylinder at high speed, with, again, an attendant risk of injury to the user. This risk does not exist with the gas spring of the present invention.

BRIEF DESCRIPTION OF THE DRAWINGS

Further objects and advantages of the invention will be apparent from the following detailed description of exemplary embodiments thereof, taken in conjunction with the accompanying drawings, in which.

DETAILED DESCRIPTION

Figure 1:
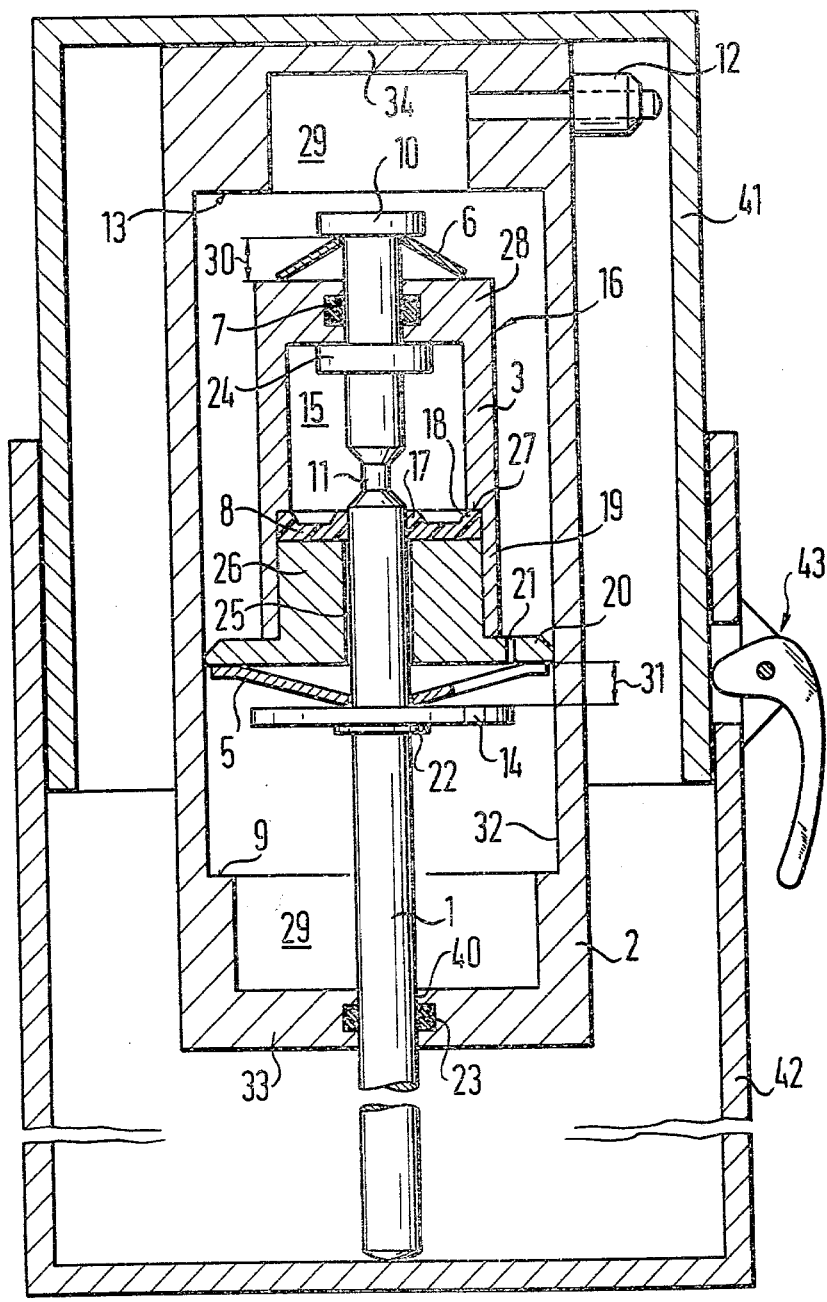
FIG. 1 is a vertical sectional view of one embodiment of the gas spring of this invention in normal operating position within surrounding telescopic tubular elements.

In the embodiment of FIG. 1, the gas spring includes a main or primary cylinder member 2 having end walls 33 and 34 and an inner cylindrical face 32, which jointly define a cavity 29 therewithin. A piston rod 1 passes through an aperture 40 in the end wall 33 and is sealed relative thereto by an annular sealing member 23 provided between the end wall 33 and the piston rod 1. A pressurized gas is contained within the cavity 29. The pressurized gas normally biases the piston rod 1 outward of the cylinder 2, i.e. downward as seen in FIG. 1. The gas spring is illustrated in FIG. 1 as being interposed between two surrounding tubular elements 41 and 42, which, for example, may be connected to the base and the table, respectively, of a draftsman's table in the manner of the aforementioned prior art device. A releasable locking device 43 of conventional design may be provided for locking the tubular elements 41 and 42 relative to one another. As will be understood, when the locking device 43 is released the elements may be slidably moved relative to one another in telescopic relation. The weight of the draftsman's table or other object supported by the tubular elements is essentially counterbalanced by the gas spring, i.e. by the pressure of the gas acting on the cross section of the piston rod 1 and biasing the piston rod 1 outward from the cavity. Desirably, the pressure within the cavity 29 is adjusted to the weight of the table or other object, so that the table or other object can be moved downward and upward with only a small external force. When the desired height is reached, the elements 41 and 42 are again locked by means of the device 43.

An auxiliary cylinder-piston device, indicated generally at 16, is provided on the piston rod 1 inside the cavity 29. The auxiliary cylinder-piston device comprises an auxiliary cylinder 3 that is co-axial with the piston rod 1 and through the upper wall 28 of which the piston rod 1 extends in sealing relation with a sealing ring 7. The upper wall 28 is held in its normal operating position relative to the piston rod by a cup-shaped resetting spring 6, which is captured between the upper surface of the wall and a radial projection 10 on the inner end of the rod 1 so as to urge the wall 28 into engagement with another radial projection 24 on the piston rod 1. An annular auxiliary piston 26 is slidably mounted within an enlarged internal diameter portion of the auxiliary cylinder 3. An annular generally U-shaped sealing member 8, fixed to the upper end face of the auxiliary piston 26, is in sealing engagement with both the cylinder portion 19 and the piston rod 1, a radially inner lip 17 of the annular sealing member 8 engaging the piston rod 1 and a radially outer lip 18 engaging the inner face of the cylinder portion 19. The radial outer lip 18 also engages the radially extending shoulder face 27 defined at the juncture of the enlarged diameter portion of the cylinder 3 and the upper portion of the cylinder. A sealed auxiliary chamber 15 is thereby defined within the auxiliary cylinder 3.

An annular gap 25 is provided between the piston rod 1 and the annular auxiliary piston 26. The annular auxiliary piston 26 is pre-stressed into its innermost position within the enlarged diameter cylinder portion 19 by a cup spring 5, which is supported at its lower end (as seen in FIG. 1) by a disc 14 fixed on the piston rod 1 by an annular fixing member 22. The radial outer and upper edge(s) of the cup spring engage a flange 20 of the annular auxiliary piston 26.

If desired, the cup spring 5 may be generally star-shaped in plan and may have alternate tongues and slots, as shown in FIG. 1, along the outer edge thereof. The inner diameter of the cup spring 5 may, if desired, be such as to engage the piston rod 1 at least in the compressed condition, but this is not essential.

The primary cylinder member 12 is provided with a gas-filling valve 12, which can be connected to an outer source of pressurized gas for controlling the pressure of gas within the cavity 29. The valve 12 may be of any suitable conventional design. When the cavity 29 has initially been filled with pressurized gas at the desired pressure for compensating for the load resting on the telescopic tube 41, the piston rod 1 is allowed to move downward from the position shown in FIG. 1 to the position shown in FIG. 2, in which the cup spring 5 abuts against an abutment face 9 provided at the lower end of the cylindrical inner face 32. An additional external force may be necessary to pull the piston rod 1 fully downward to the position shown in FIG. 2 against the resetting force of the cup-shaped spring 6.

The piston rod 1 is formed with a circumferential, generally V-shaped recess 11, which in the normal operating position of the auxiliary cylinder-piston device 16 (shown in FIG. 1) is out of engagement with the annular sealing member 8. When, however, the auxiliary device 16 is in the position of FIG. 2, the recess 11 is in radial alignment with the annular sealing member 8 and extends across the sealing lip 17, so that the auxiliary chamber 15 is in pressure-equalizing communication with the cavity 29 via the recess 11 and the annular gap 25. When the piston rod 1 is then released, it will be returned upward to the normal position of FIG. 1 by the resetting force of the cup-shaped resetting spring 6, and the pressure in the auxiliary chamber 15 is then equal to the pressure in the cavity 29. The telescopic tube arrangement 41, 42 may then once again be adjusted to the desired height and locked by the locking device 43. During this adjustment, the pressure within cavity 29 may be slightly increased due to the inward movement of the piston rod 1 into the cavity 29, whereby the pressure in the cavity 29 might become higher than the pressure in the auxiliary chamber 15.

If, after the height adjustment, the adjusted height is maintained for a long period of time, some gas may escape through the aperture 40, with a resulting decrease in the pressure in the cavity 29. If the pressure drop in the cavity 29 is large enough, the residual pressure might not be high enough to balance the load on the telescopic tube 41 when the locking device 43 is again released, which could result in the tube 41 dropping abruptly upon release of the locking device. This occurrence, however, is prevented by the present invention as explained below.

When the pressure in cavity 29 has decreased to the point that the pressure differential between the auxiliary chamber 15 and the cavity 29 is large enough to overcome the pre-stress of the star-shaped cup spring 5, the auxiliary piston 26 will be urged downward by the pressure within the chamber 15. The cup spring 5 will thereby be axially compressed between the flange 20 and the supporting disc 14. By this axial compression, the outer diameter of the star-shaped cup spring 5 will be increased, so that the radial outer edge thereof comes into braking engagement with the internal face 32 of the cylinder 2. The piston rod 1 will therefore be held axially relative to the cylinder member 2 even if the locking device 43 is released, and no sudden dropping of the load can occur.

The braking action of the spring 5 can be released by refilling the cavity 29 from an external pressure source through the filling valve 12. As will be appreciated, the increase of pressure in cavity 29 causes the annular auxiliary piston 26 to return to the normal position shown in FIG. 1, whereupon the outer edge of the spring 5 is out of engagement with the inner wall of the cylinder 2. Preferably, the cup-shaped resetting spring 6 is stronger than the cup spring 5, so that under the action of the pressure differential between cavity 29 and auxiliary chamber 15 only the spring 5 will be compressed to an essential degree. On the other hand, when the piston rod 1 is pulled downward, as aforementioned, to the pressure-equalization position of FIG. 2 only the resetting spring 6 will be compressed. In this position the star-shaped cup spring 5 remains substantially uncompressed. The axial extent of the cup-shaped resetting spring 6 is designated by 30 in FIG. 1, and the axial extent of the star-shaped cup spring 5 is designated by 31. The axial extents 30 and 31 as shown in FIG. 1 correspond to the normal operating position of the auxiliary cylinder and piston, i.e., their position when the pressure in the auxiliary chamber 15 is substantially equal to the pressure in the cavity 29.

As shown in FIG. 1, the lower edge of the enlarged diameter part 19 of the auxiliary cylinder 3 engages the flange 20 when the cyliner 3 is in the normal operating position. The axial length of the part 19 is preferably such that, when the cylinder 3 is in this position, the shoulder face 27 axially engages the sealing lip 18 on the seal member 8. On the other hand, the abutting action between the lower end of the part 19 and the flange 20 prevents destructive compression of the sealing lip 18 when the piston rod 1 is pulled downward towards the pressure-equalizing position of FIG. 2.

The flange 20 suitably is provided with at least one passage 21 for permitting gas flow between the upper and lower compartments of the cavity 29, which compartments may be separated by the flange 20. The flange 20, therefore, may act as a damping piston, and it may also provide an additional guiding function for movement of the piston rod 1 within the cylinder 2. As shown in FIG. 1, the upper part of the cylinder member 2 is formed with a shoulder face 13 that is adapted to be engaged by the top wall 28 of the auxiliary piston 3 when the piston rod 1 approaches its innermost terminal position within the main cylinder 2.

Referring now again to FIG. 2, it is to be observed that when the piston rod 1 moves axially inward with respect to the cylinder member 2 from the position there shown towards the position of FIG. 1, the pressure in the cavity 29 is increased in correspondence with the relative cross sections of the piston rod 1 and the cylinder member 2 and the extent to which the piston rod extends into the cylinder 2. It will be understood, therefore, that a condition of exact pressure balance between the auxiliary chamber 15 and the cavity 29 will not exist when, following a pressure equalization step in which the auxiliary cylinder and piston are in the position of FIG. 2, the parts are returned to the position of FIG. 1. The function of the braking structure of the invention, however, is not detrimentally affected by this unbalanced condition. As will be understood by those skilled in the art, the spring characteristic and pre-stress of the cup spring 5 may be selected to bring the spring 5 into locking engagement with the cylinder wall at any desired axial position of the piston rod 1 with respect to the cylinder member 2. Stated otherwise, the pressure increase in cavity 29 over the pressure in chamber 15 due to the entry of the piston rod 1 into the cavity 29 may be taken into account in determining the pressure differential between the chamber 15 and cavity 29 at which the braking structure is to become engaged by proper selection of the characteristic and pre-stress of the cup spring 5. By using different springs 5 or by conventional adjusting means for adjusting the pre-stress of cup spring 5, it is therefore easily possible to determine the pressure conditions at which the braking structure is to become active.

Figure 2:
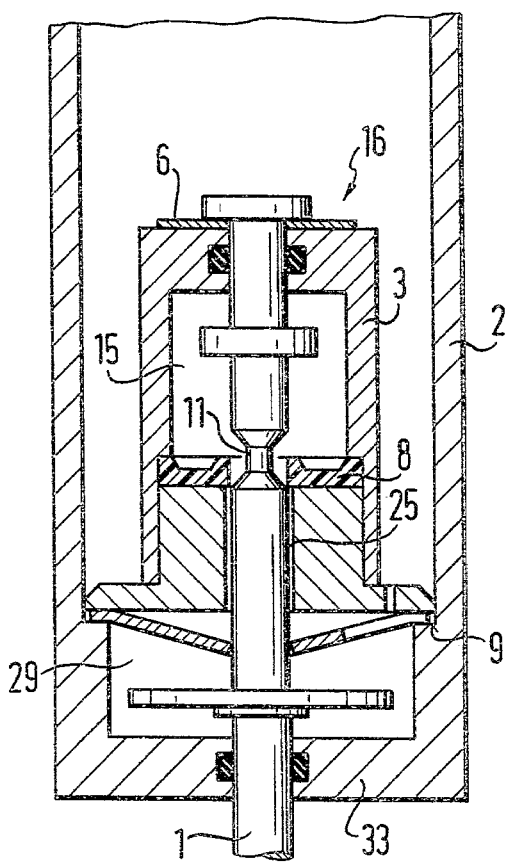
FIG. 2 is a partial vertical sectional view of the gas spring of FIG. 1, showing the auxiliary cylinder and piston in the position in which the pressure within the auxiliary chamber is equalized with the pressure in the main cylinder cavity.
Figure 3:
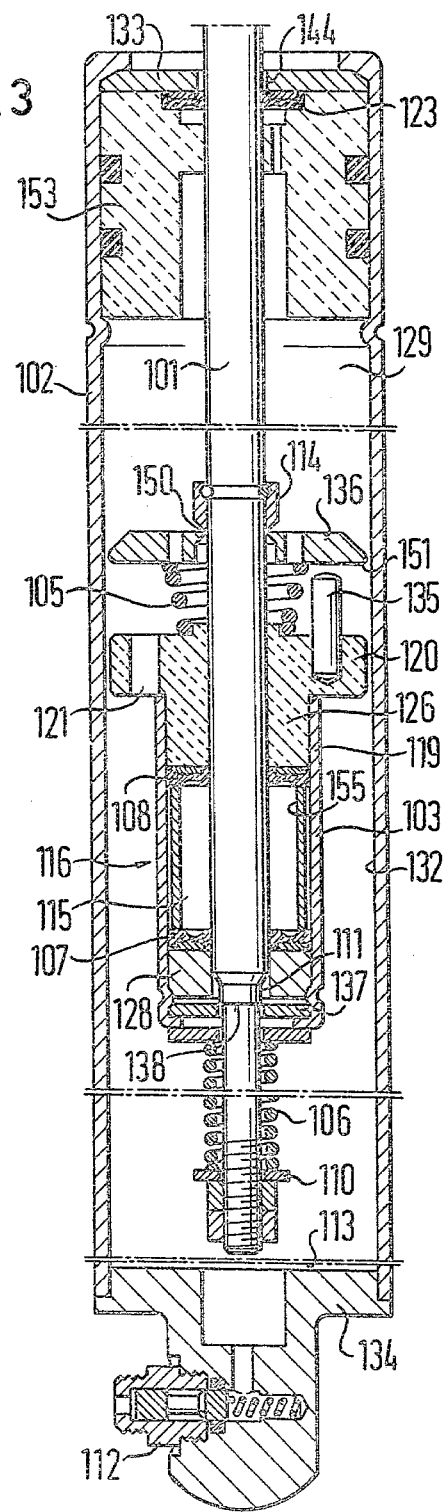
FIG. 3 is a vertical sectional view of another embodiment of the invention.

The embodiment of FIG. 3 is in many respects similar to the embodiment of FIGS. 1 and 2, and like reference numerals, increased by one hundred, are therefore used to identify like parts. In this embodiment, the cup-shaped resetting spring 6 has been replaced by a compression coil spring 106 and the star-shaped cup spring 5 has been replaced by a compression coil spring 105. Coil spring 105, however, does not itself fulfill the braking action. Rather, a tiltable disc 136 is mounted on the piston rod 101 by a member 114 for this purpose. The inner diameter of the disc 136 and the adjacent, tapered end of the mounting member 114 define a tilting fulcrum 150. The disc 136 is provided with an outer peripheral edge 151 which is axially offset with respect to the tilting fulcrum 150, so that in case of a tilting movement of the disc 136 the outer peripheral edge 151 comes into engagement with the inner cylindrical face 132, thereby braking the piston rod relative to the cylinder. Thus, when the pressure within the cavity 129 drops by a predetermined amount relative to the pressure within the chamber 115, the magnitude of which is determined by the compression coil spring 105, the auxiliary piston 126 moves upward (as depicted in FIG. 3) under the biasing action of the gas pressure within chamber 115. This results in the pin 135 mounted on the auxiliary piston 120 coming into contact with the disc 136 and causing it to tilt about the fulcrum 150, thereby engaging the braking structure.

Releasing of the braking structure in the embodiment of FIG. 3 is effected in a way analogous to that described above in connection with the embodiment of FIGS. 1 and 2, i.e. by refilling the cavity 129 through the refilling valve 112 to restore the desired pressure balance between the chamber 115 and the cavity 129. Refilling is accomplished, as described more fully hereinafter, by axially moving the piston rod 101 such that a circumferential recess 111 formed on the piston rod is positioned opposite the sealing member 107. When so positioned, a clearance exists between the piston rod 101, on the one hand, and the end wall 128 and seal member 107, on the other hand, through which gas can flow between the chamber 115 and the cavity 129.

Pressure equalization between the cavity 129 and the auxiliary chamber 115 is effected by pulling the piston rod 101 upward (as shown in FIG. 3) until the disc 136 abuts the guiding member 153 provided at the upper end wall 133 of the primary cylinder 102. Upon further upward movement of the rod 101, the tilting pin 135 engages the underside of the disc 136 and shifts the auxiliary cylinder-piston device downward with respect to the piston rod 101 against the resetting action of the compression coil spring 106. This positions the recess 111 in the piston rod axially across the annular sealing member 107 and opens the chamber 115 to the cavity 129. An abutment disc 137 is provided at the lower end of the auxiliary cylinder 103. This disc 137 cooperates with a shoulder face 138 provided on the piston rod 101, so that in the normal operating position (shown in FIG. 3) the abutment disc 137 is held in engagement with the shoulder face 138 by the resetting action of the coil spring 106. The compression coil spring 106 is stronger than the compression coil spring 105, so that when braking conditions occur the position of the auxiliary cylinder 103 remains substantially unchanged with respect to the piston rod 101, whereas the auxiliary piston 126 moves upward with respect to the piston rod 101 to tilt the disc 136 into braking engagement with the cylinder wall 132. When the piston rod 101 approaches its innermost position within the cylinder member 102, a disc 110 carried by the inner end of the piston rod abuts an end face 113 at the cylinder end wall 134, whereby the coil 106 may be compressed. This prevents abrupt bottoming of the piston rod in the cylinder 102.

Although the invention has been described with respect to specific embodiments thereof, many modifications and variations of such embodiments may be made by those skilled in the art without departing from the inventive concepts disclosed. Accordingly, all such modifications and variations are intended to be included within the spirit and scope of the appended claims.

We claim:

1. In a gas spring including a cylinder member, having a longitudinal axis, an internal cylindrical face and two end walls which together define a cavity within the cylinder member, a piston rod extending axially through an aperture in one of said end walls and being axially movable with respect to said cylinder member between two terminal positions, guiding and sealing means adjacent said aperture for sealingly guiding said piston rod within said aperture; a body of pressurized gas within said cavity, said gas normally biasing said piston rod towards one of said terminal positions, and pressure responsive means carried at least in part by said piston rod for braking the axial movement of said piston rod with respect to said cylinder member when the pressure of said gas within said cavity decreases below a predetermined minimum value, the improvement in said pressure responsive braking means comprising:

(a) an auxiliary cylinder-piston unit carried by said piston rod within said cavity for common movement of said unit with said piston rod with respect to said cylinder member, said unit including an auxiliary cylinder and an auxiliary piston received therein and defining therewith an auxiliary chamber which is separated from said cavity under normal operational conditions during the path of movement of said piston rod with respect to said cylinder member, one of said auxiliary cylinder and said auxiliary piston being movable with respect to the other in response to a pressure differential between said auxiliary chamber and said cavity, pressure adjusting valve means movable between a normally closed position, in which said valve means prevents gas flow between said auxiliary chamber and said cavity, and an open position, in which said valve means permits gas flow between said auxiliary chamber and said cavity for adjusting the pressure within said auxiliary chamber to the pressure within said cavity, and operating means operable from outside said cylinder member for moving said valve means from said closed position to said open position;

(b) a braking device carried by said piston rod within said cavity for movement between a first position, in which said braking device is in mechanical engagement with the inner cylindrical face of said cylinder member, and a second position, in which said device is out of engagement with said inner cylindrical face; and (c) means operatively coupling the movable one of said auxiliary cylinder and said auxiliary piston to said braking device for bringing said braking device into mechanical engagement with the inner cylindrical face of said cylinder member in response to an unintended drop of the pressure in said cavity resulting in a predetermined pressure differential between said auxiliary chamber and said cavity, independently of the relative position of said piston rod and said cylinder member.

2. The gas spring of claim 1, wherein said cylinder piston unit further includes means for pre-stressing at least said movable one of said auxiliary cylinder and said auxiliary piston into a position in which said braking device is in said second position.

3. The gas spring of claim 1, wherein said valve operating means includes means for moving said piston rod with respect to said cylinder member.

4. The gas spring of claim 3, wherein said valve means is moved to said open position when said piston rod approaches one of its terminal positions.

5. The gas spring of claim 4, wherein said one terminal position is the outermost terminal position of said piston rod relative to said cylinder member.

6. The gas spring of claim 1, wherein said auxiliary piston is movable relative to said auxiliary cylinder and said operatively coupling means couples said auxiliary piston to said braking device.

7. The gas spring of claim 2, wherein said braking device comprises an axially elastically compressible braking member extending radially towards said internal cylindrical face, the radial extent of said braking member being increased by axial compression, and said operative coupling means couples the movable one of said auxiliary piston and cylinder to said braking device for axial compression of said braking member in response to said predetermined pressure differential.

8. The gas spring of claim 7, wherein said axially elastically compressible braking member also comprises said pre-stressing means.

9. The gas spring of claim 1, wherein said auxiliary cylinder-piston unit is co-axially mounted on said piston rod.

10. The gas spring of claim 9, wherein at least one of said auxiliary cylinder and said auxiliary piston is annular and surrounds said piston rod.

11. The gas spring of claim 9, wherein said braking device comprises a metal member of non-planar configuration which is axially interposed between an abutment member on said piston rod and said movable one of said auxiliary cylinder and piston, said metal member being elastically compressible in axial direction in response to movement of said movable member so as to increase its radial extent.

12. The gas spring of claim 11, wherein said metal member is a cup-shaped spring member.

13. The gas spring of claim 12, wherein said cup-shaped spring member is substantially star-shaped.

14. The gas spring of claim 1, further comprising means for filling said cavity with pressurized gas and controlling the pressure thereof.

15. The gas spring of claim 1, further comprising a damping piston carried by said piston rod within said cavity for sliding engagement with said inner cylindrical face.

16. In a gas spring including a cylinder member, having a longitudinal axis, an internal cylindrical face and two end walls which together define a cavity within the cylinder member, a piston rod extending axially through an aperture in one of said end walls and being axially movable with respect to said cylinder member between two terminal positions, guiding and sealing means adjacent said aperture for sealingly guiding said piston rod within said aperture; a body of pressurized gas within said cavity, said gas normally biasing said piston rod towards one of said terminal positions, and pressure responsive means carried at least in part by said piston rod for braking the axial movement of said piston rod with respect to said cylinder member when the pressure of said gas within said cavity decreases below a predetermined minimum value, the improvement in said pressure responsive braking means comprising:

(a) an auxiliary cylinder-piston unit carried by said piston rod within said cavity, said unit including an auxiliary cylinder and an auxiliary piston received therein and defining therewith an auxiliary chamber, one of said auxiliary cylinder and said auxiliary piston being movable with respect to the other in response to a pressure differential between said auxiliary chamber and said cavity, a pressurized body of gas within said auxiliary chamber, valve means movable between a closed position, in which said valve means prevents gas flow between said auxiliary chamber and said cavity, and an open position, in which said valve means permits gas flow between said auxiliary chamber and said cavity, and operating means operable from outside said cylinder member for moving said valve means between said first and second positions;

(b) a braking device comprising a tilting member tiltably mounted on said piston rod for tilting movement about an axis transverse to said longitudinal axis between a first tilting position, in which said tilting member is in braking engagement with the internal cylindrical face of said cylinder member, and a second tilting position, in which said tilting member is out of engagement with said internal cylindrical face, said cylinder-piston unit further including means for pre-stressing at least said movable one of said auxiliary cylinder and said auxiliary piston into a position in which said tilting member is in said second tilting position; and (c) means operatively coupling the movable one of said auxiliary cylinder and said auxiliary piston to said tilting member for moving said tilting member to said first tilting position in response to a predetermined pressure differential between said auxiliary chamber and said cavity.

17. The gas spring of claim 16, wherein said braking device includes means for biasing said tilting member towards said second tilting position.

18. The gas spring of claim 17, wherein said biasing means comprises said pre-stressing means.

19. The gas spring of claim 16, wherein said tilting member comprises an annular tilting disc tiltably mounted on said piston rod, for tilting about said transverse axis and having an engagement edge on its outer periphery which is axially offset from said transverse axis.

20. The gas spring of claim 19, wherein said operative coupling means comprises an axially extending member mounted on the movable one of said auxiliary cylinder and piston for engagement with said tilting disc at a point radially offset from said longitudinal axis.

21. In a gas spring including a cylinder member, having a longitudinal axis, an internal cylindrical face and two end walls which together define a cavity within the cylinder member, a piston rod extending axially through an aperture in one of said end walls and being axially movable with respect to said cylinder member between two terminal positions, guiding and sealing means adjacent said aperture for sealingly guiding said piston rod within said aperture; a body of pressurized gas within said cavity, said gas normally biasing said piston rod towards one of said terminal positions, and pressure responsive means carried at least in part by said piston rod for braking the axial movement of said piston rod with respect to said cylinder member when the pressure of said gas within said cavity decreases below a predetermined minimum value, the improvement in said pressure responsive braking means comprising:

(a) an auxiliary cylinder-piston unit co-axially mounted on said piston rod and carried by said piston rod within said cavity, said unit including an auxiliary cylinder and an auxiliary piston received therein and defining therewith an auxiliary chamber, one of said auxiliary cylinder and said auxiliary piston being movable with respect to the other in response to a pressure differential between said auxiliary chamber and said cavity, a pressurized body of gas within said auxiliary chamber, valve means movable between a closed position, in which said valve means prevents gas flow between said auxiliary chamber and said cavity, and an open position, in which said valve means permits gas flow between said auxiliary chamber and said cavity, and operating means operable from outside said cylinder member for moving said valve means between said first and second positions;

(b) a braking device carried by said piston rod within said cavity for movement between a first position, in which said braking device is in engagement with the inner cylindrical face of said cylinder member to brake said piston rod relative to said cylinder member, and a second position, in which said device is out of engagement with said inner cylindrical face; and (c) means operatively coupling the movable one of said auxiliary cylinder and said auxiliary piston to said braking device for bringing said braking device into engagement with the inner cylindrical face of said cylinder member in response to a predetermined pressure differential between said auxiliary chamber and said cavity;

said auxiliary cylinder-piston unit being axially movable with respect to said piston rod between a normal operation position, corresponding to the closed position of said valve means, and a second position, corresponding to the open position of said valve means, against the action of resilient resetting means tending to urge said unit towards said normal operating position, said valve means comprising an annular sealing member carried by said auxiliary cylinder-piston unit in surrounding relation to said piston rod, said sealing member sealingly engaging said piston rod when said auxiliary cylinder-piston unit is in said normal operating position, and a circumferential recess in said piston rod, said recess extending axially across said annular sealing member when said cylinder-piston unit is in said second position.

22. The gas spring of claim 21, wherein said cylinder member further includes abutment means for blocking the movement of said auxiliary cylinder-piston unit with respect to said cylinder member, when said piston rod approaches one of said terminal positions, whereby on further movement of the piston rod towards said terminal position the said resilient resetting means are compressed.

23. The gas spring of claim 22, wherein said cylinder member and said piston rod are connected to respective objects which are slidably movable with respect to each other in said longitudinal direction, and locking means are provided for locking the sliding movement of said objects.

* * * * *

UNITED STATES PATENT AND TRADEMARK OFFICE
CERTIFICATE OF CORRECTION

PATENT NO. : 4,309,026
DATED : January 5, 1982
INVENTOR(S) : Hermann Reuschenbach and Willi Schäfer It is certified that error appears in the above-identified patent and that said Letters Patent are hereby corrected as shown below:

First page, item [30], "Dec. 11, 1978" should read --Dec. 22, 1978--;

Col. 3, line 28, "matter" should read --manner--;

Col. 5, line 3, "member 12" should read --member 2--;

Col. 9, line 13, after "cylinder" insert a hyphen (-).

Signed and Sealed this

First Day of June 1982

[SEAL]

Attest:

Attesting Officer

GERALD J. MOSSINGHOFF

Commissioner of Patents and Trademarks